(12) United States Patent
Kitani et al.

(10) Patent No.: US 8,770,258 B2
(45) Date of Patent: Jul. 8, 2014

(54) SUNSHADE APPARATUS FOR VEHICLE

(75) Inventors: Takashi Kitani, Nagoya (JP); Kazuhiko Yoshizawa, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 364 days.

(21) Appl. No.: 13/200,349

(22) Filed: Sep. 23, 2011

(65) Prior Publication Data
US 2012/0111511 A1  May 10, 2012

(30) Foreign Application Priority Data

Nov. 5, 2010   (JP) .................................. 2010-248001
Mar. 28, 2011  (JP) .................................. 2011-069814

(51) Int. Cl.
B60J 7/06  (2006.01)

(52) U.S. Cl.
USPC ...................... 160/265; 160/370.22; 296/219

(58) Field of Classification Search
USPC .......... 160/265, 273.1, 322, 370.22; 296/219, 296/143, 142
See application file for complete search history.

(56) References Cited

U.S. PATENT DOCUMENTS

| | | | |
|---|---|---|---|
| 262,398 A * | 8/1882 | Gerard ........................... | 160/265 |
| 3,180,401 A * | 4/1965 | Gambon et al. ............... | 160/265 |
| 3,386,489 A * | 6/1968 | Denton et al. .................. | 160/25 |
| 3,768,540 A * | 10/1973 | McSwain ...................... | 160/23.1 |
| 4,596,093 A * | 6/1986 | Esposito .......................... | 52/86 |
| 6,874,845 B2 | 4/2005 | Engl et al. | |
| 6,899,380 B2 * | 5/2005 | Kralik et al. ................... | 296/214 |
| 7,568,752 B1 * | 8/2009 | Lin ............................... | 296/97.8 |
| 7,950,440 B2 | 5/2011 | Rockelmann et al. | |
| 2005/0161175 A1 * | 7/2005 | Tussinger ...................... | 160/265 |
| 2008/0179024 A1 * | 7/2008 | Fichter et al. ............. | 160/370.22 |
| 2008/0252105 A1 | 10/2008 | Jansen et al. | |
| 2008/0277077 A1 | 11/2008 | Rockelmann et al. | |
| 2010/0148540 A1 * | 6/2010 | Hotta et al. .................... | 296/215 |
| 2012/0000164 A1 | 1/2012 | Boldrini et al. | |

FOREIGN PATENT DOCUMENTS

| | | |
|---|---|---|
| DE | 102004049167 | 4/2006 |
| DE | 10 2005 048 207 | 11/2006 |
| DE | 10 2005 040 758 | 3/2007 |
| JP | 2000-272341 A | 10/2000 |

OTHER PUBLICATIONS

Extended European Search Report for EP Appl. No. 11187512.6 dated May 11, 2012.

* cited by examiner

*Primary Examiner* — David Purol
(74) *Attorney, Agent, or Firm* — Finnegan, Henderson, Farabow, Garrett & Dunner, LLP

(57) ABSTRACT

A sunshade apparatus for a vehicle includes a shading sheet, which opens and closes a light transmitting portion of a vehicle roof, a pair of holding members, which retain the shading sheet, a winding member, which winds the shading sheet and the holding members. The shading sheet is retained at edge portions of the shading sheet, which extend in the shading sheet opening-closing directions by the holding members. The holding members are retained to the winding member in a manner so that winding in at one end in turn winds off the other end and movement direction thereof is reversed at a direction change member positioned at a distance from the winding member in the shading sheet opening-closing directions and the winding member includes a biasing member, which balances tensional force acting in the shading sheet opening-closing directions at one end and the other end of each holding member.

8 Claims, 7 Drawing Sheets

SUNSHADE APPARATUS FOR VEHICLE

CROSS REFERENCE TO RELATED APPLICATIONS

This application is based on and claims priority under 35 U.S.C. §119 to Japanese Patent Application 2010-248001, filed on Nov. 5, 2010, and Japanese Patent Application 2011-069814, filed on Mar. 28, 2011, the entire content of which is incorporated herein by reference,

TECHNICAL FIELD

This disclosure generally relates to a sunshade apparatus for a vehicle.

BACKGROUND DISCUSSION

In a known sunshade apparatus for a vehicle disclosed in U.S. Pat. No. 6,874,845 B2, a garnish attached to an end of the shading sheet is equipped with a leaf spring at both ends of the garnish for the purpose of adjusting a shading sheet to stay open at a desired position against the winding force of a retracting unit. According to the disclosure in U.S. Pat. No. 6,874,845 B2, a frictional force is produced by each leaf spring pressing against a corresponding guide rail and works against a biasing force in a retraction direction to maintain the opening state of the sunshade apparatus.

In another known sunshade apparatus for a vehicle disclosed in JP2000-272341A, a garnish and a retracting unit for winding a shading sheet are connected by wires for a purpose of reducing operational force. Winding directions of the wires and the shading sheet are opposite to each other in a manner so that when the shading sheet is wound off, a retracting unit winds in the wires in turn. Spring biased guide rollers provide tensional forces to the wires and the shading sheet to balance the tensional force on the wire and the tensional force on the shading sheet. According to the disclosure in JP2000-272341A, the shading sheet includes the garnish at the front end, and the garnish is supported in a manner to slide freely along guide rails intermediated by shoes.

According to the disclosure in U.S. Pat. No. 6,874,845 B2, a large operational force is required because a frictional force is constantly working to support the garnish.

According to the disclosure in JP2000-272341A, a downward slacking of the closed shading sheet easily occurs at the middle portion because the wires are retaining the shading sheet from the front end alone via the garnish.

A need thus exists for a sunshade apparatus for a vehicle which is not susceptible to the drawbacks mentioned above.

SUMMARY

In light of the foregoing, the disclosure provides a sunshade apparatus for a vehicle which includes a shading sheet, which opens and closes a light transmitting portion of a vehicle roof, a pair of holding members, which retains the shading sheet, a winding member, which winds the shading sheet and the holding members. The shading sheet is retained at a pair of edge portions of the shading sheet, which is opposing each other and extending in shading sheet opening-closing directions by the holding members. The holding members are retained to the winding member in a manner so that winding in at one end in turn winds off the other end and a direction of movement thereof is reversed at a direction change member positioned at a distance from the winding member in the shading sheet opening-closing directions, and the winding member includes a biasing member which balances tensional forces acting in the shading sheet opening-closing directions at one end and the other end of each of the holding members.

According to the disclosure, a blind arrangement for use in a vehicle includes a winding roller, a blind web configured to be provided below a light transmitting portion formed in a roof of the vehicle, the blind web being configured to be manually operated in order to at least partially cover and expose the light transmitting portion relative to an interior of the vehicle, and a balancing device for causing the blind web at rest when the blind web is out of operation. The balancing device includes (a) a single spring from which a force is continually delivered and (b) a force transmitting device transmitting the force via two different paths to the blind web for biasing the blind web in opposite directions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
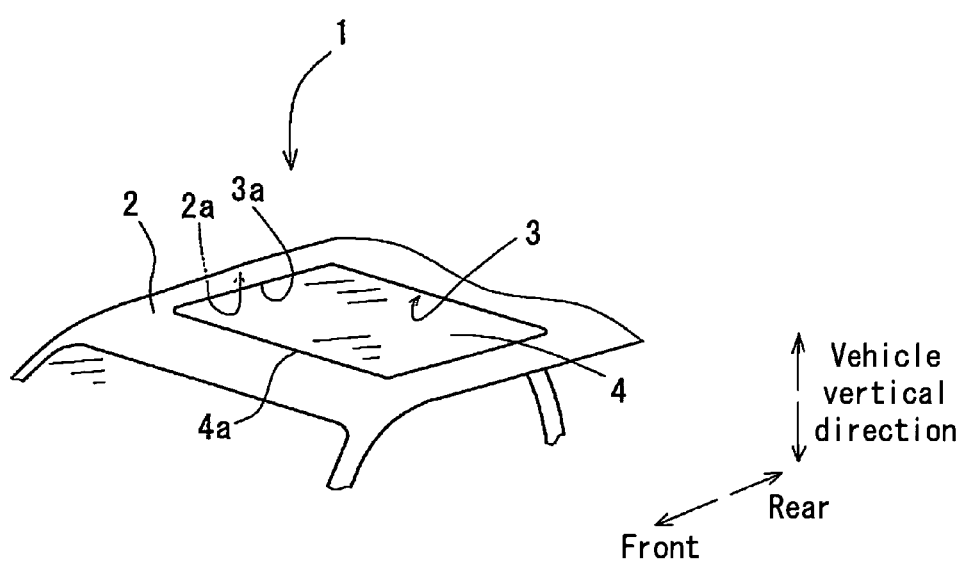
FIG. 1 is a perspective view of a vehicle roof in which a sunshade apparatus according to a first embodiment is installed.

A first embodiment of a sunshade apparatus 11 (serving as a sunshade apparatus for a vehicle) will be described as follows, FIG. 1 illustrates a perspective view of a roof 1 of a vehicle in which the sunshade apparatus 11 according to the first embodiment will be installed. A roof panel 2 that forms the roof 1 includes a light transmitting portion 3, which is installed with a transparent panel 4 made of transparent glass, resin, or other similar material, to take in sunlight. An outer periphery portion 4a of the transparent panel 4 is treated with a sealing member for a purpose of preventing rainwater to enter a vehicle compartment. The sunshade apparatus 11 illustrated in FIG. 2 is installed to a surface on a vehicle compartment side 2a near side edges 3a of a light transmitting portion of the roof panel to take in or shield sunlight by opening or closing the sunshade apparatus 11.

Figure 2:
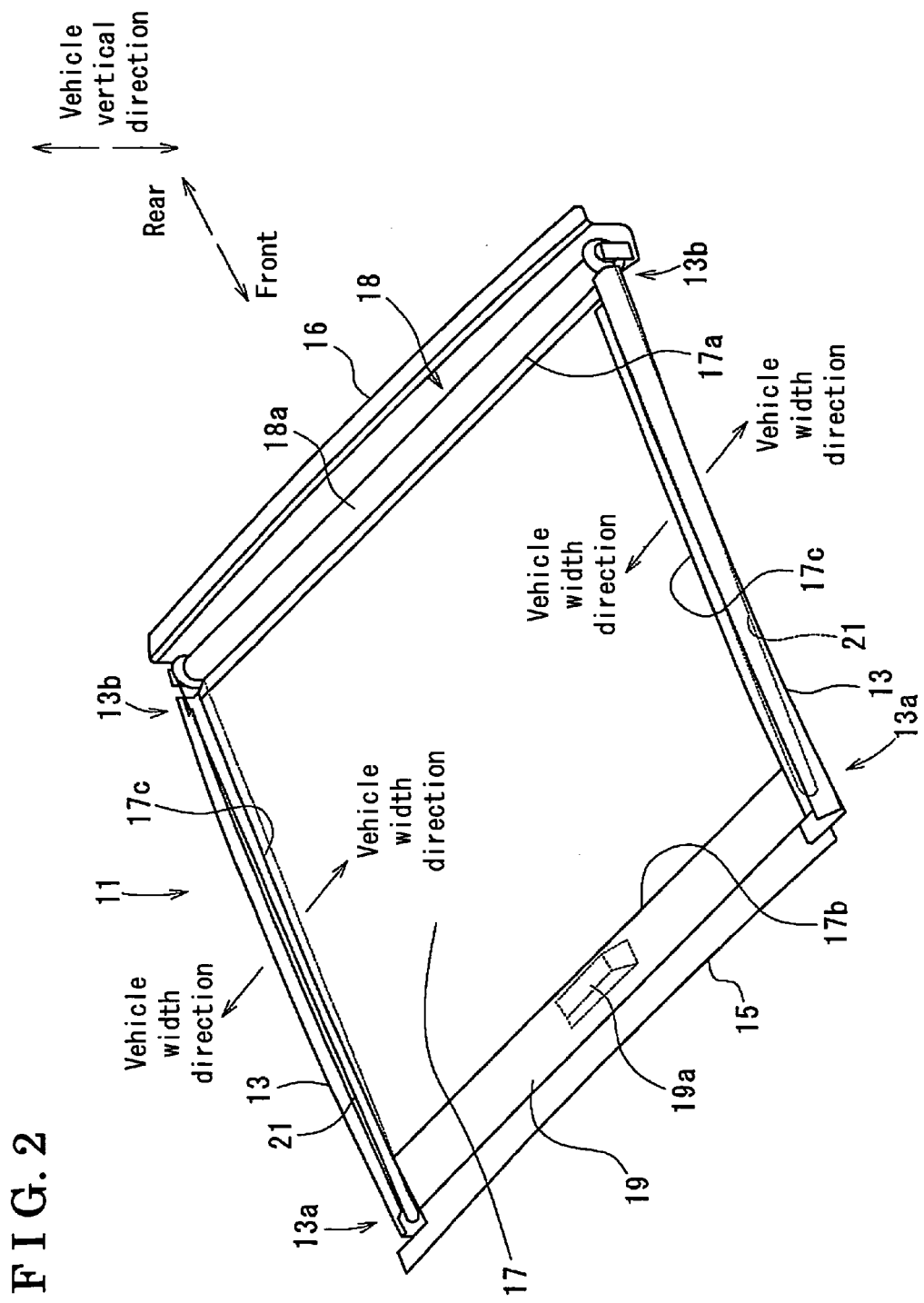
FIG. 2 is a perspective view of the sunshade apparatus according to the first embodiment in a closed state.

FIG. 2 is a perspective view of the sunshade apparatus 11 in a closed state according to the first embodiment. Guide rails 13, each of which is extending in vehicle front and rear directions (equivalent to shading sheet opening-closing directions) and opposing to each other in the vehicle width directions (equivalent to opposing directions), are positioned to the surface 2a on the vehicle compartment side of the roof panel 2. Each of the guide rails 13 is curved to fit the shape of the roof panel 2 and is connected to each other by a front frame 15 and a rear frame 16, both of which are extending in the vehicle width directions, at a front end portion 13a and at a rear end portion 13b respectively. Each of the guide rails 13 is produced by extrusion of aluminum or similar material and each frame 15, 16 is produced by pressing a steel plate or similar material into a shape.

The rear frame 16 rotationally supports a retracting unit 18 (serving as a winding member), which winds a shading sheet 17 about a rotation axis in the vehicle width directions. The retracting unit 18 includes a core portion 18a extending in the vehicle width directions. A rear edge portion 17a positioned at a rear portion of the shading sheet 17 is retained at the core portion 18a. A front edge portion 17b positioned at a front portion of the shading sheet 17 has a garnish 19 (serving as a moving member) attached thereto and the garnish 19 moves along the guide rails 13 in the vehicle front and rear directions. The garnish 19 is equipped with an operating portion 19a, which serves as a handle for operation. Each of side edge portions 17c (serving as edge portions) arranged in the vehicle width directions of the shading sheet 17 is retained by a corresponding wire 21 (serving as a holding member) stretched in the vehicle front and rear directions. The shading sheet 17 is weaved by using a nylon fiber or other similar material to have an approximately 0.4 mm thickness. Each of the wires 21 is formed to be approximately 0.4 mm in diameter by using a para-aramid resin (e.g. Kevlar®) or similar material having a low frictional coefficient and high tensile strength.

Figure 3:
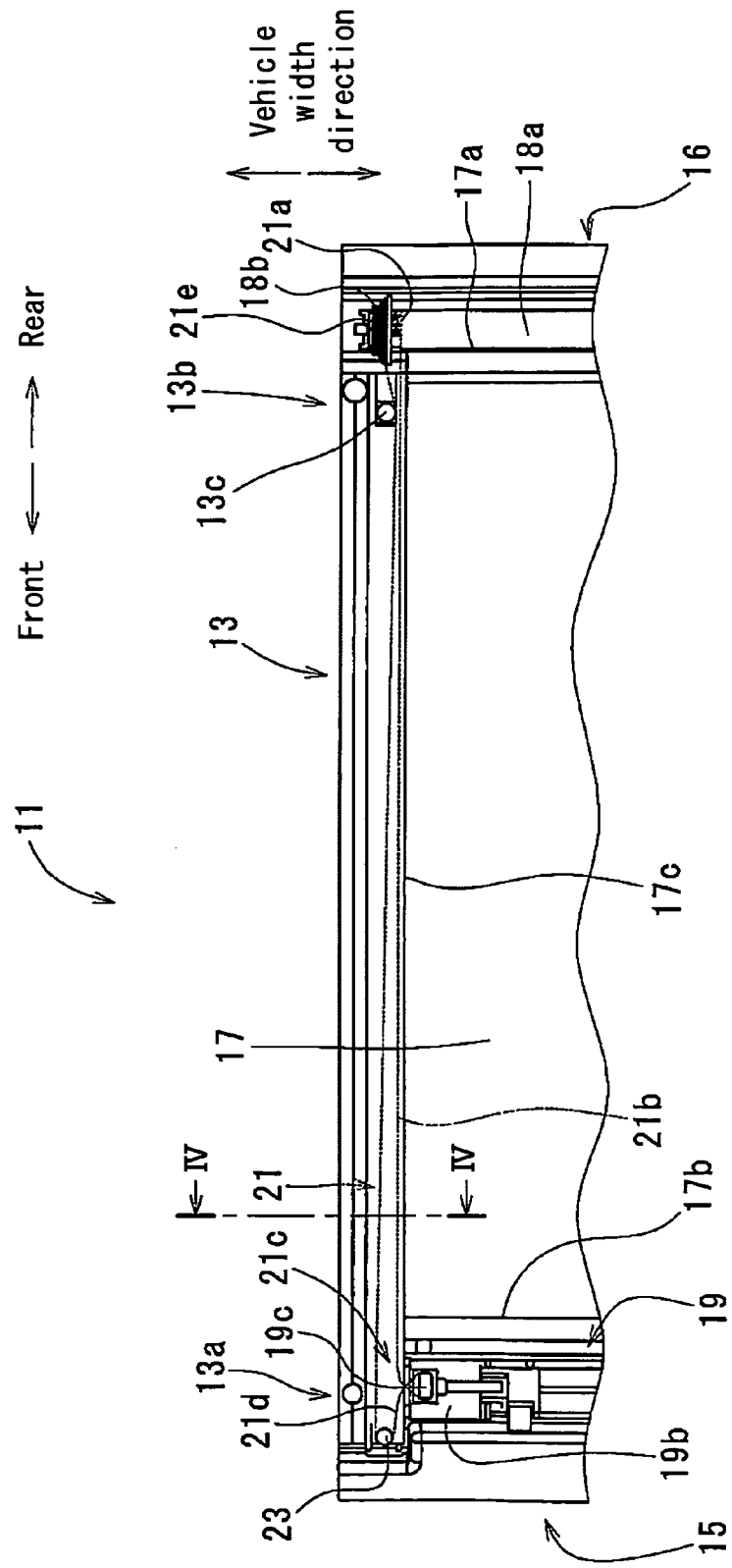
FIG. 3 is a partial plan view that illustrates an outward portion of the sunshade apparatus in the vehicle width direction according to the first embodiment.

FIG. 3 is a partial plan view that illustrates an outward portion of the sunshade apparatus 11 in the vehicle width direction of the according to the first embodiment. The rear edge portion 17a of the shading sheet 17 is retained by the core portion 18a of the retracting unit 18 together with a root portion 21a of each wire 21. Alternatively, the root portion 21a of each wire 21 may be retained by the core portion 18a of the retracting unit 18 via the shading sheet 17. A holding portion 21b, which is at a position in the vehicle front direction with respect to the root portion 21a of each wire 21, retains the shading sheet 17 by engaging to the corresponding side edge portion 17c of the shading sheet 17. Each of garnish end portions 19b (serving as both ends in opposing directions 19b), which is positioned outwardly in the vehicle width direction of the garnish 19, includes a pillar portion 19c formed to project in vehicle upward-downward directions 22a, 22b. Each of the pillar portions 19c is positioned inwardly in the vehicle width direction with respect to the corresponding wire 21. At a locking portion 21c of each wire 21, winding of the wire 21 starts from outwardly in the vehicle width direction and wound around the pillar portion 19c toward vehicle rear direction, then folded back toward outwardly for the vehicle width direction and pulled out in vehicle front direction. In other words, at the locking portion 21c of each wire 21, the wire 21 is engaged to the corresponding pillar portion 19c by being wound around the pillar portion 19c in an winding method known as an alpha winding. A cooperating portion 21d, a portion on each wire 21 positioned next to the locking portion 21c in the vehicle front direction changes moving direction along a guide roller 23 (serving as a direction change member) positioned at the front end portion 13a of the guide rail 13. Each guide roller 23 having a rotation axis in vehicle upward-downward directions 22a, 22b is rotationally positioned at the corresponding front end portion 13a. The cooperating portion 21d on each of the wires 21 is wound around the corresponding guide roller 23 horizontally and folded back outwardly in the vehicle width direction to change the moving direction in the vehicle rear direction. The cooperating portion 21d on each of the wires 21 moving toward the vehicle rear direction contacts a guiding portion 13c (serving as a guiding member), which is formed to project in the vehicle upward direction 22a at the rear end portion 13b of the guide rail 13, to be guided so that a cooperating edge portion 21e of the cooperating portion 21d is retained to the wire winding portion 18b (serving as a winding member portion) of the retracting unit 18.

Figure 4:
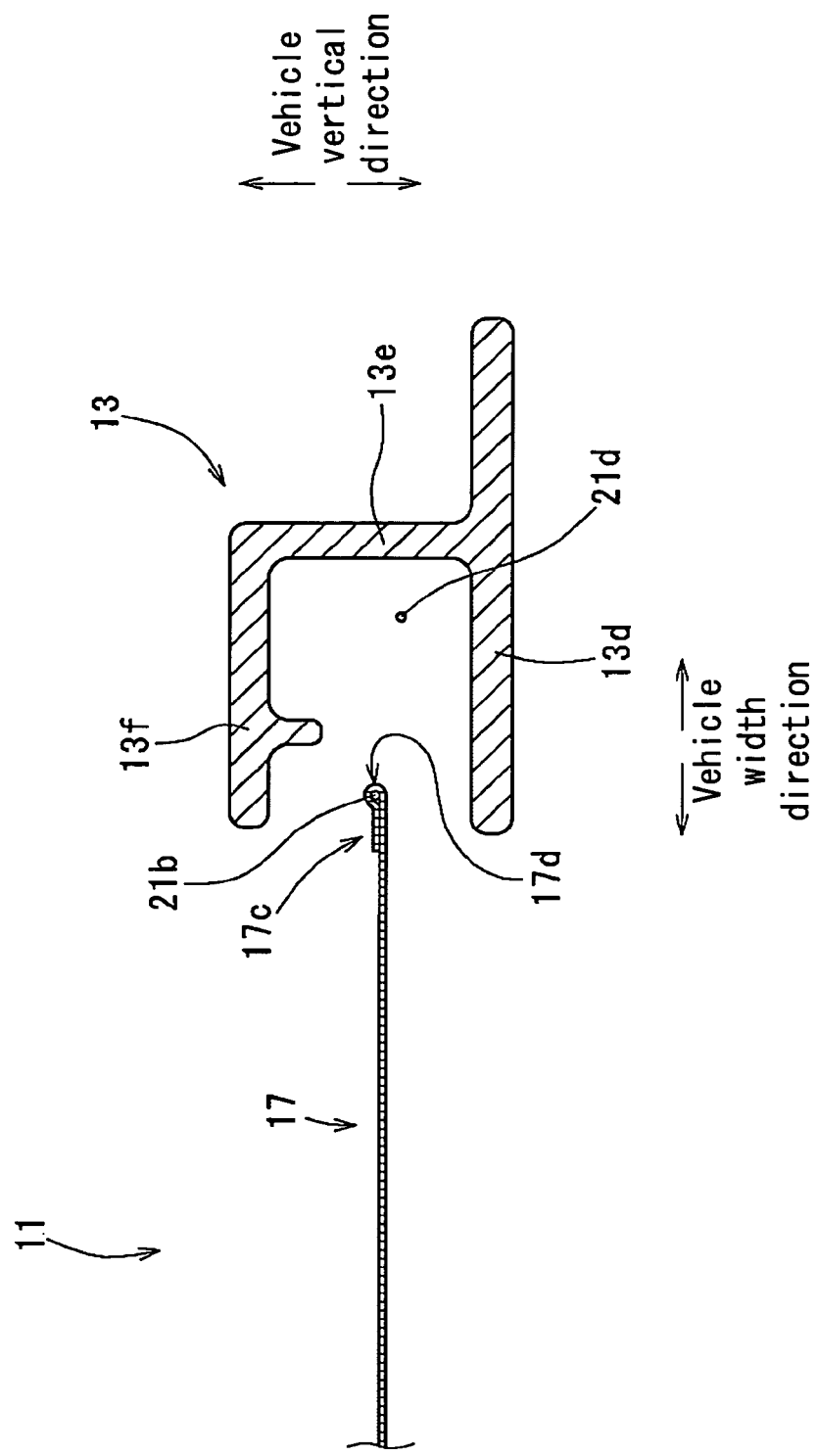
FIG. 4 is a cross-sectional view of the sunshade apparatus according to the first embodiment taken along a line IV/IV in FIG. 3 vertically in vehicle front and rear directions.

FIG. 4 is a cross-sectional view of the sunshade apparatus 11 according to the first embodiment taken along a line IV-IV in FIG. 3 vertically in the vehicle front and rear directions. Each of the guide rails 13 includes a side wall portion 13e, which extends in the vehicle upward direction 22a from a lower frame portion 13d, which extends in the vehicle width directions, and an upper frame portion 13f, which extends inwardly in the vehicle width direction from an edge of the side wall portion 13e in the vehicle upward direction 22a. Each of the side edge portions 17c of the shading sheet 17 is folded inwardly in the vehicle width direction at each of the folded portions 17d extending in the vehicle front and rear directions, to enfold each of the holding portion 21b, then sewn at a position inwardly in the vehicle width direction with respect to the folded portion 17d in a manner to avoid the corresponding holding portion 21b being sewn-in. The shading sheet 17 is retained to the wires 21 by the holding portions 21b being enfolded by the side edge portions 17c. With respect to the holding portion 21b, each of the cooperating portions 21d, which is folded back at the corresponding guide roller 23, is positioned outwardly in the vehicle width direction on a same horizontal level or on an offset level in the vehicle upward-downward directions 22a, 22b. Each of the folded portions 17d is positioned to overlap with the corresponding upper frame portion 13f and the lower frame portion 13d in the vehicle upward-downward directions 22a, 22b to be inconspicuous. In other words, each of the wires 21 engages to the shading sheet 17 at the holding portion 21b, the portion of the corresponding wire 21 positioned inwardly in the vehicle width direction.

Figure 5:
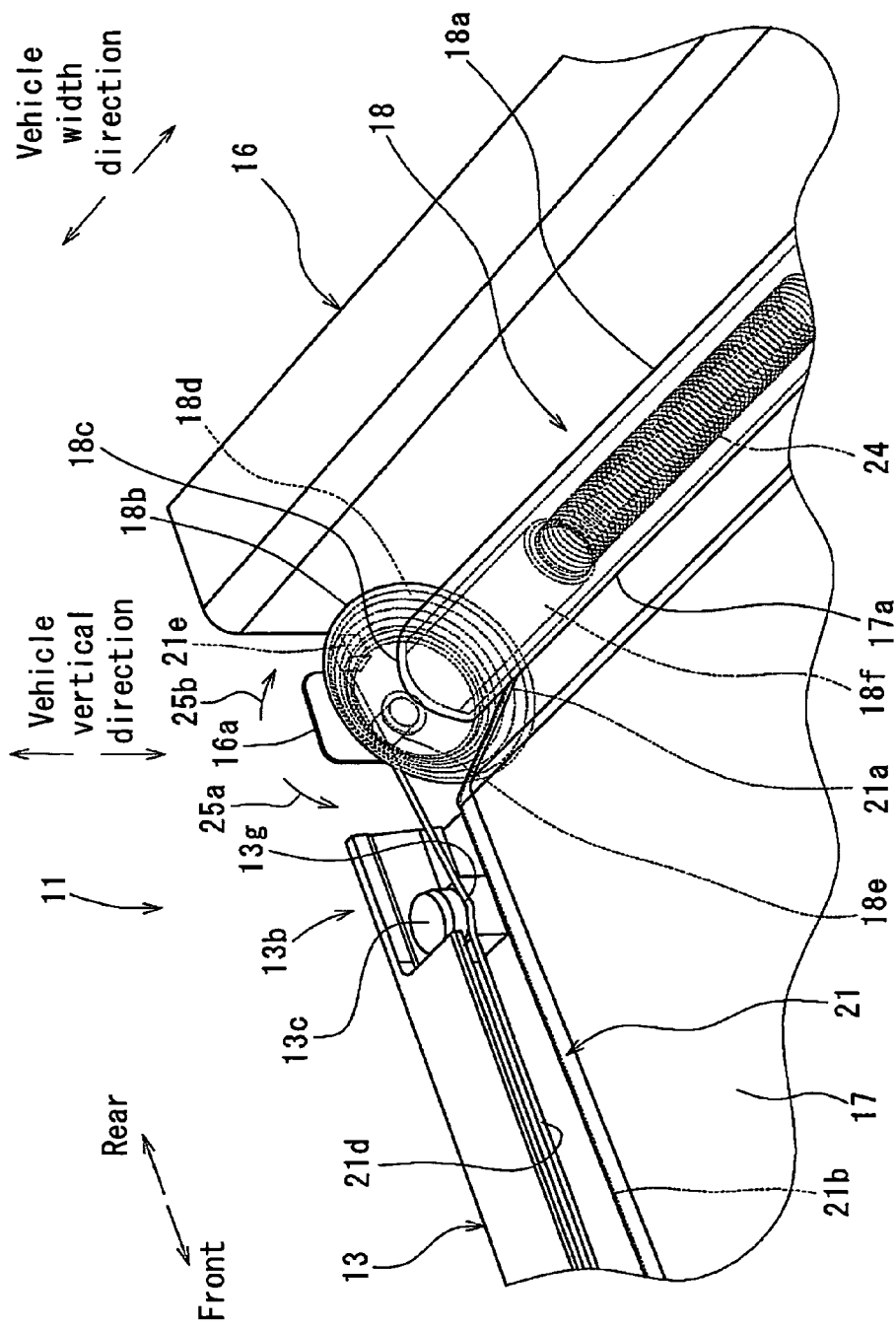
FIG. 5 is a partial perspective view of the sunshade apparatus according to the first embodiment that illustrates a retracting unit.

FIG. 5 is a partial perspective view of the sunshade apparatus 11 according to the first embodiment that illustrates the retracting unit 18. The retracting unit 18 includes the cylindrical core portion 18a, which extends in the vehicle width directions, and wire winding portions 18b, each of which fits into the corresponding core portion edge 18c that is positioned at the ends in the vehicle width directions of the core portion 18a. The core portion 18a internally contains torsion springs 24 (serving as a biasing member), which is for biasing the retracting unit 18. The core portion 18a retains the rear edge portion 17a of the shading sheet and the root portions 21a of the wires 21. Each of the wire winding portions 18b retains a cooperating edge portion 21e of the corresponding wire 21. Each of the wire winding portions 18b, which is a conical portion with a diameter thereof becoming smaller toward outwardly in the vehicle width direction, includes a spirally formed winding groove 18d to wind the corresponding wire 21 in a line. Each of the wire winding portions 18b includes a bearing portion 18e defined outwardly in the vehicle width direction at an end thereof. Each of the bearing portions 18e rotationally supports the retracting unit 18 by fitting to a corresponding shaft retaining portion 16a defined outwardly in the vehicle width direction at an end of the rear frame 16. Each of the wire winding portions 18b includes a cylindrical fitting portion 18f formed to extend inwardly in the vehicle width direction and fits to the inner periphery of the core portion 18a to retain the core portion 18a to coaxially rotate and in a relative rotation with the wire winding portions 18b. An end of each torsion spring 24, which is internally contained in the core portion 18a, is engaged to the core portion 18a and the other end is engaged to the fitting portion 18f. The torsion springs 24 bias the core portion 18a in a rotating direction 25a for opening the shading sheet 17 and the wire winding portion 18b in a rotating direction 25b for closing the shading sheet 17 to consistently provide a tension on the wires 21. The rear end portion 13b of each guide rail 13 includes the guiding portion 13c extending in the vehicle upward direction 22a. Each of the guiding portions 13c includes a guiding groove 13g circumferentially provided around the surface extending in the vehicle upward-downward directions 22a, 22b. Each of the wires 21 contacts the guiding groove 13g of the corresponding guiding portion 13c and is biased inwardly in the vehicle width directions and in the vehicle downward direction 22b.

An opening operation of the sunshade apparatus 11 will be described as follows. When using the operation portion 19a of the garnish 19 as a handle and moving the garnish 19 in the vehicle rear direction, each of the cooperating portions 21d is pulled via the locking portion 21c, which is engaged to the pillar portion 19c, and moves in the vehicle rear direction. Meanwhile, a portion close to the wire winding portion 18b on each of the cooperating portions 21d, moves in the vehicle front direction and rotates the corresponding guide roller 23 in the direction of the movement and changes the direction of the movement along the guide roller 23. When each of the cooperating portions 21d moves, a portion of the cooperating portion 21d already wound around the corresponding wire winding portion 18b is wound off in turn, and rotates the retracting unit 18 in the rotating direction 25a for opening the shading sheet 17. When the retracting unit 18 rotates, the shading sheet 17 and the holding portions 21b are wound around the core portion 18a in an overlapping manner, which in turn increases a thickness of the retracted portion around the core portion 18a in a radial direction. The diameter at the wound off portion increases because the wound off portion of the cooperating portion 21d moves inwardly in the vehicle width direction along the spiral formed on each winding portion 18b and also because the cone angle of each wire winding portion 18b is defined so that diameters of the retracted portion and the wound off portion are consistently equal to each other. The diameter of the retracted portion during the opening operation of the sunshade apparatus 11 includes the thickness of the shading sheet 17 and the thickness of the holding portions 21b wound around the core portion 18a and measured at the outer periphery. The diameter at the wound off portion is the outer diameter measured at the position that the cooperating portion 21d is wound off from the wire winding portion 18b. During the closing operation, the relationship of the diameters of the retracted portion and the wound off portion and the portions associated to the retraction and winding off for example the core portion 18a and wire winding portions 18b are switched. By the diameter of the retracted portion and the wound off portion being equal to each other and the tensional forces provided to the wires 21 at the retracted portion and the wound off portion being equal to each other, a torque exerted on the core portion 18a and the wire winding portions 18b is consistently balanced while the shading sheet 17 is at rest. Because the garnish 19 includes the pillar portions 19c that engage the wires 21 at the positions inwardly in the vehicle width direction with respect to each of the wires 21, force components of the tensional forces act outwardly in the vehicle width direction on the garnish 19. By the pillar portions 19c being symmetrically positioned at both garnish end portions 19b and the force components of the tensional forces are balanced in the vehicle width directions, the garnish 19, which is consistently centered, slides in the vehicle front and rear directions without contacting the guide rails 13 and stops by contacting the guiding portions 13c functioning as stoppers.

A closing operation of the sunshade apparatus 11 will be described next. Basically, each member involved for the closing operation operates in a reverse direction for the opening operation. When the garnish 19 is moved in the vehicle front direction, the shading sheet 17 and the holding portions 21b are wound off from the core portion 18a and the retracting unit 18 rotates in the rotating direction 25b for closing the shading sheet 17. Each of the cooperating portion 21d is wound around the corresponding wire winding portion 18b in a line along the winding groove 18d, by being in contact with the guiding groove 13g of the corresponding guiding portion 13c and biased inwardly in the vehicle width direction and in the vehicle downward direction 22b. As a winding of each of the cooperating portions 21d progresses, the diameter at each wound portion becomes smaller and the winding position moves outwardly in the vehicle width direction.

The first embodiment is effective on achieving following results.

According to an aspect of the first embodiment, the sunshade apparatus 11 retains the shading sheet 17 at a desired position by the tensional force balanced in the vehicle front and rear directions being applied to the shading sheet 17 via the wires 21 and the garnish 19. Therefore, while retaining the shading sheet 17 at a desired position, the operational force for opening or closing the shading sheet 17 is decreased compared to when a position of the garnish 19 is retained by a frictional force against a biasing force in the closing direction, which requires the operational force against such frictional force when moving the garnish 19. Retaining of the shading sheet 17 at the desired position is more stable with the aforementioned method of applying the balanced tensional force to the wires 21 compared to the method which uses the frictional force, which is being more susceptible to vibrations that cause a decrease in stability of the biasing force for retaining the shading sheet 17. Being less susceptible to large vibrations from a vehicle, an embodiment of the sunshade apparatus 11 disclosed here is further applied to SUVs and vehicles for developing countries, which are likely to be driven on non-paved roads. In addition, because the shading sheet 17 is retained at both side edge portions 17c by the wires 21 with the tensional force in vehicle upward-downward directions 22a, 22b, the slacking that may occur at the middle portion 13h of the shading sheet 17 is decreased compared to when the shading sheet 17 is retained by the garnish 19 alone.

According to another aspect of the first embodiment, by forming the holding members with wires 21, a thickness of each of the holding members is reduced, which in turn reduces a radius of the retracting unit 18 when the shading sheet 17 is retracted, which in turn reduces a protruding amount of the sunshade apparatus 11 in the vehicle upward-downward directions 22a, 22b toward a vehicle interior, which results in providing more room to a person in the vehicle for more comfort. Additionally, because the shading sheet 17 is engaged to each of the wires 21 by enfolding the corresponding side edge portion 17c around the wire 21, each of the wires 21 is free from the restriction of the shading sheet 17 so that each of the wires 21 maintains a straight line form with less effort, or maintains the tension with less force. Requiring less tensional force requires a lower setting of a spring constant for the torsion spring 24. Thus a lighter or less strength material may be used to form the retracting unit 18 to reduce the weight of the sunshade apparatus 11 as a whole.

According to further aspect of the first embodiment, each of the wires 21 is guided to fold back outwardly in the vehicle width direction with the corresponding guide roller 23 no that the holding portion 21b and the cooperating portion 21d are aligned in parallel. Therefore, the overlapping of holding portions 21b and the cooperating portions 21d in the vehicle upward-downward directions 22a, 22b is avoided and the thickness of the sunshade apparatus 11 is reduced.

According to another aspect of the first embodiment, the locking portion 21c of each of the wires 21 is engaged to the corresponding pillar portion 19c at both garnish end portions 19b by being wound in an winding method known as the alpha winding, so that the wires 21 are biased to be balanced both in vehicle front and rear directions and the vehicle width directions. Therefore, shoes or other members required for centering the shading sheet 17 are made unnecessary, and in addition, frictional forces available for opening or closing the shading sheet 17 when sliding shoes or other members are suppressed at the same time, thus the operational force is reduced.

According to further aspect of the first embodiment, the diameter at the wire winding portions 18b, which winds in or winds off the wires 21, is changed according to the length of the wound wires 21 to equal with the diameter at the core portion 18a of the shading sheet 17, so that a torque exerted on the retracting unit 18 is equilibrated, thus operational force of the sunshade apparatus 11 is reduced. In addition, by each of the guiding portions 13c guiding the cooperating portion 21d of the corresponding wire 21 with a biasing force inwardly in the vehicle width direction, winding accuracy at the wire winding portion 18b is controlled and the cooperating portion 21d are wound in a line without becoming loose.

A second embodiment of a sunshade apparatus 11 will be described as follows.

Descriptions of composing members involved in the second embodiment functioning equally to the first embodiment are omitted and generally indicated by providing a same reference numeral.

Figure 6:
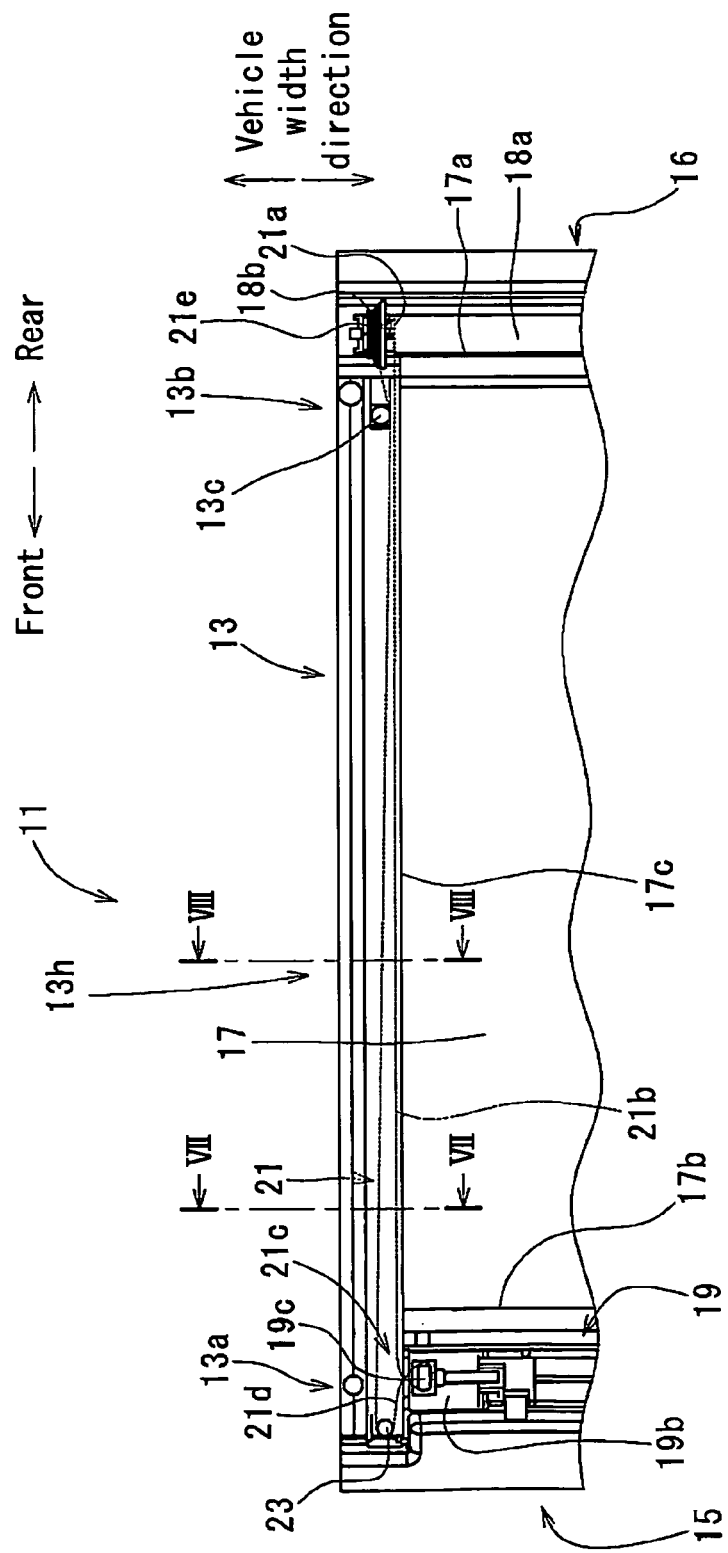
FIG. 6 is a partial plan view that illustrates an outward portion of the sunshade apparatus in the vehicle width direction according to the second embodiment.

FIG. 6 is a partial plan view that illustrates the outward portion of the sunshade apparatus 11 in the vehicle width direction according to the second embodiment. Each of the root portions 21a, which is a rear end of the holding portion 21b of each wire 21, is retained by the core portion 13a of the retracting unit 18 (or the rear end is supported by the retracting unit 18 in a wound state), and the front end portion 13a of the holding portion 21b of the wire 21 is supported to the pillar portion 19c in a wound state. In other words, when the front and rear ends of the holding portion 21b are retained, the holding portion 21b of the wire 21 is provided with a tensional force. The first embodiment provides support of the shading sheet 17 at the front and rear end of the holding portion 21b alone. In this condition, the holding portion 21b may be pulled inwardly in the vehicle width direction by a weight of the shading sheet 17, especially during the shading sheet 17 is in a closed state. The shape of each of the guide rails 13 is partially modified in the second embodiment.

Figure 7:
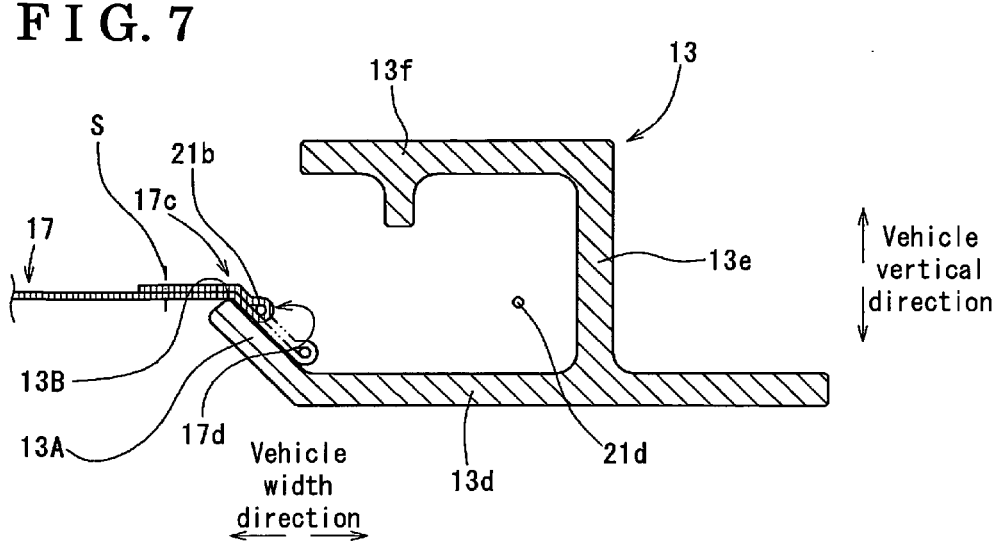
FIG. 7 is a cross-sectional view of the sunshade apparatus according to the second embodiment taken along a line VII-VII in FIG. 6 vertically in the vehicle front and rear directions.

FIG. 7 is a cross-sectional view of the sunshade apparatus 11 according to the second embodiment taken along a line VII-VII in FIG. 6 vertically in the vehicle front and rear direction.

Figure 8:
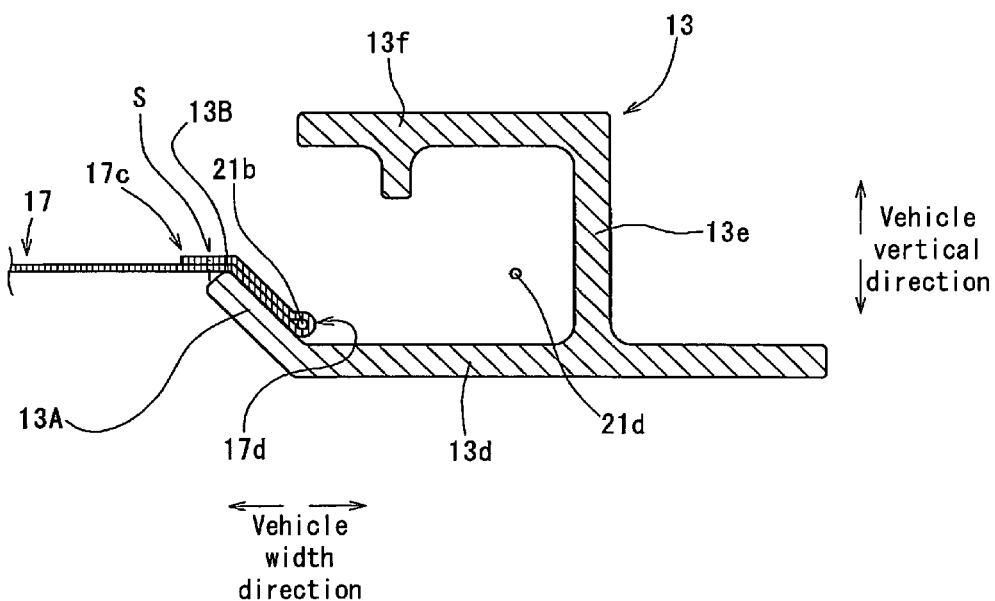
FIG. 8 is a cross-sectional view of the sunshade apparatus according to the second embodiment taken along a line VII-VII in FIG. 6 vertically in the vehicle front and rear directions.

FIG. 8 is a cross-sectional view of the sunshade apparatus 11 according to the second embodiment taken along a line VIII-VIII in FIG. 6 vertically in the vehicle front and rear direction.

As illustrated in FIGS. 7 and 8, each of the guide rails 13 includes the lower frame portion 13d, the side wall portion 13e, the upper frame portion 13f and a slanted portion 13A (serving as a contact portion). In detail, each of the side wall portions 13e extends in the vehicle upward direction 22a from each of the lower frame portions 13d, which extends in the vehicle width directions and each of the upper frame portions 13f extends inwardly in the vehicle width direction from an edge for the vehicle upward direction 22a of each side wall portion 13e. Moreover, each of the slanted portions 13A extends from an edge at inwardly in the vehicle width direction of each lower frame portion 13d toward a direction which is inwardly in the vehicle width direction and the vehicle upward direction 22a (i.e., bent in the vehicle upward direction 22a, which is different from a direction inwardly in the vehicle width direction.

Further, each of the side edge portions 17c of the shading sheet 17 is folded inwardly in the vehicle width direction at each of the folded portions 17d extending in the vehicle front and rear directions, to enfold each of the holding portions 21b, then sewn at a stitching position S (indicated with an alternate long and short dash line in FIG. 7 and in FIG. 8), which is a position inwardly in the vehicle width direction relative to each of the folded portions 17d, in a manner to avoid the corresponding holding portion 21b being sewn-in. The shading sheet 17 is retained to the wires 21 by the holding portions 21b being enfolded by the side edge portions 17c.

Each of the slanted portions 13A biases the holding portion 21b of the corresponding wire 21 and the shading sheet 17 outwardly in the vehicle width direction by being in contact with the corresponding side edge portion 17c. In other words, each of the slanted portions 13A is a slanted surface that generates a force component outwardly in the vehicle direction when a force is applied in the vehicle upward-downward directions 22a, 22b.

Note that each of the root portions 21a, which is the rear end portion 13b of the holding portion 21b of each wire 21, is retained to the core portion 18a of the retracting unit 18 (or the rear end portion 13b is retained to the retracting unit 18 by being rolled in) and each of the front and portions 13a of the holding portion 21b of each wire 21 is retained by being wound around the corresponding pillar portion 19c. Thus, each of the holding portions 21b is conditioned to take the shortest route between the supporting portions at the front end and the rear end. In addition, each of the guide rails 13 is curved in a manner so that middle portion in the vehicle front and rear directions is projecting in the vehicle upward direction 22a. Therefore, an area of the edge portion 17c of the shading sheet 17 that interact with the corresponding slanted portion 13A is established to be larger at a middle portion 13h in the vehicle front and rear directions (as illustrated in FIG. 7 with an alternate long and two short dashes line and in FIG. 8), relative to the area at the front end portion 13a and rear end portion 13b (serving as both end portions) in the vehicle front and rear directions (refer to FIG. 7). The alternate long and two short dashes line in FIG. 7 indicates the edge portion 17c of the shading sheet 17 illustrated in FIG. 8.

An end portion 13B positioned in the vehicle upward direction 22a of each of the slanted portion 13A is chamfered for avoiding a sharp edge damaging the shading sheet 17. Further, the shading sheet 17 contacts the end portion 13B at a position outwardly in the vehicle width direction relative to the stitching position S throughout the operation of the shading sheet 17. Therefore, cutting of the stitching member, for example a stitching thread, which is used to stitch the shading sheet 17, is avoided. When a strong enough stitching member is used, the stitching position S may be positioned to interact with the end portion 138.

The shading sheet 17, which contacts the slanted portion 13A of each of the guide rails 13, is formed of a material having a good sliding characteristic. A sliding characteristic may be improved by coating the side edge portion 17c that contacts the slanted portion 13A with a resin and other materials.

The second embodiment is effective on achieving following results in addition to the aforementioned results described for the first embodiment.

According to an aspect of the second embodiment, while using the wires as holding members makes the shading sheet 17 vulnerable to slacking inwardly in the vehicle width direction, the slanted portions 13A bias the wires 21 and the shading sheet 17 outwardly in the vehicle width direction to generate tensional forces, so that, while reducing the width required for the holding members by using wires, slacking of the shading sheet 17 is controlled favorably.

According to further aspect of the second embodiment, the guide rails 13 are curved to project in the vehicle upward direction 22a for providing a larger area of the side edge portion 17c of the shading sheet 17 which interacts with the corresponding slanted portions 13A at the middle portion 13h in the vehicle front and rear directions where more slacking of the shading sheet 17 may occur compared to the area at the front end portion 13a and rear end portion 13b. With the aforementioned manner, a larger tensional force is generated at the middle portion 13h of the shading sheet, so that the slacking of the shading sheet 17 is controlled favorably at where more slacking may occur compared to at the front end and rear end portions 13a, 13b in the vehicle front and rear directions of the shading sheet 17 where slacking is less.

Further arrangements of the first and the second embodiments will be described as follows.

The wires 21, which form the holding members in the aforementioned embodiments, may be formed by belts, chains, or similar.

The locking portions 21c of the wires 21, which are wound around the pillar portions 19c of the garnish end portions 19b in an winding method known as the alpha winding in the aforementioned embodiments, may be engaged to the pillar portions 19b by hooking or methods other than winding.

The garnish 19, which is retained to the wires 21 and the tensional forces thereof in the aforementioned embodiments, may be additionally retained to the guide rails 13 by providing separate shoes or similar retaining members.

The wire 21, which is provided with the tensional force with the torsion springs 21 in the aforementioned embodiments, may be provided with the tensional force by being formed with an elastic material as a whole or in part.

The side edge portions 17c of the shading sheet 17, which are retained by the holding portions 21b of the wires 21 being enfolded by the side edge portions 17c in the aforementioned embodiments, may be integrated with the holding portions 21b by adhesion, welding, stitching or by other methods, or may be integrally formed with the holding portions 21b.

The sunshade apparatus 11, which is opened and closed manually in the aforementioned embodiments, may be operated by an additional separate motor or other mechanism to rotate the retracting unit 18 and the garnish 19 may be moved in parallel by using a rack belt or other members. Because the tensional forces of the wires 21 stably keep an opening amount of the sunshade apparatus 11, an application of a worm gear or similar mechanism to prevent reverse rotation in the closing direction is unnecessary. By considering causes for lowering power transmission efficiency, for example worm gear slip or other similar causes, a necessary motor driving power is kept small.

The shape of each of the slanted portions 13A, which is formed with a flat surface in the aforementioned embodiments, may be formed with a curved surface or other shapes that generates a force component.

According to the disclosed embodiments, the sunshade apparatus 11 decreases an operational force for opening or closing the shading sheet 17, retains the shading sheet 17 at a desired position, and at the same time decreases a slacking that may occur at the middle portion 13h of the shading sheet 17.

According to an aspect of this disclosure, the sunshade apparatus 11 includes a shading sheet 17, which opens and closes a light transmitting portion 3 of a vehicle roof, a pair of wires 21, which retains the shading sheet 17, a the retracting unit 18, which winds the shading sheet 17 and the wires 21. The shading sheet 17 is retained at the pair of side edge portions 170 which is opposing each other and extending in the vehicle front and rear directions by the wires 21. The wires 21 are retained to the retracting unit 18 in a manner so that winding in at one end in turn winds off the other end and a direction of movement thereof is reversed at a guide roller 23 positioned at a distance from the retracting unit 18 in the vehicle front and rear directions, and the retracting unit 18 includes the torsion spring 24, which balances tensional forces acting in the vehicle front and rear directions at one end and the other end of each of the wires 21.

By the tensional force balanced in the vehicle front and rear directions being applied to the shading sheet 17 via the wires 21, the shading sheet 17 is retained at a desired position and the operational force for opening or closing the shading sheet 17 is decreased compared to when a position of the desired position of the shading sheet 17 is retained by a frictional force. Also, the shading sheet 17 is retained at both side edge portions 17c by the wires 21 with the tensional force acting in the vehicle upward-downward directions 22a, 22b, therefore the slacking that may occur at the middle portion 13h of the shading sheet 17 is decreased.

According to another aspect of this disclosure, a wire is used for each holding member and the shading sheet 17 is engaged to each of the wires 21 by enfolding the wire 21 by the corresponding side edge portion 17c.

By forming the holding members with wires, a thickness of each holding member is reduced. The shading sheet 17 is engaged to each of the wires 21 by enfolding the corresponding side edge portion 17c around the wire 21, so that each of the wires 21 is free from the restriction of the shading sheet 17 to maintain the tensional force with less effort.

According to further aspect of this disclosure, each wire is arranged side by side in the vehicle width directions to form an inner portion and an outer portion by being folded back at the guide roller 23. The inner portion includes the holding portion 21b, which engages to the shading sheet 17.

By guiding each of the wires 21 to folded back in the vehicle width direction at the corresponding guide roller 23 to be aligned in parallel to avoid overlapping of the holding portions 21b and the cooperating portions 21d in the vehicle upward-downward directions and so that each of the wires 21 is engaged to the shading sheet 17 at a holding portion 21b which is positioned inwardly in the vehicle width directions, thickness of the sunshade apparatus 11 is reduced.

According to another aspect of this disclosure, the shading sheet 17 includes a garnish 19 at an end in the vehicle front and rear directions, and the garnish 19 is engaged at both ends thereof in the vehicle width directions in the garnish edge portion 19b to the wires 21 to be biased by wires 21 toward the vehicle width directions.

The garnish 19 is centered by being biased by the wires 21 in both the vehicle front and rear directions and the vehicle width directions. Therefore, the members for the centering are made unnecessary and the total number of necessary parts is reduced. At the same time, frictional forces available when sliding such members are suppressed and the operational force is reduced.

According to further aspect of this disclosure, the sunshade apparatus 11 further includes a guiding portion 13c, which guides each of the wires 21 toward a corresponding wire winding portion 18b. The guiding portion 13c biases the wire 21 toward the vehicle width directions for winding each wire 21 in a line to the corresponding wire winding portion 18b. An end position of each of the wires 21 at a corresponding wire winding portion 18b shifts in the vehicle width directions so that the diameter at one end where the wire 21 is being wound off at one end is kept equal with the diameter at the other end where the wire 21 is being wound in.

The diameter at the wire winding portion 18b is changed according to the length of the wound wires 21 to equal with the diameter at the retracted portion of the shading sheet 17, so that a torque exerted on the retracting unit 18 is equilibrated, thus operational force of the sunshade apparatus 11 is reduced. In addition, the wires 21 are guided to the wire winding portion 18b with a biasing force inwardly in the vehicle width direction, in order to avoid the wires 21 becoming loose.

According to another aspect of this disclosure, an embodiment of the sunshade apparatus 11 includes guide rails 13 for guiding the garnish 19 in the vehicle front and rear directions. Each of the guide rails 13 includes the slanted portion 13A that contacts the corresponding side edge portion 17c at the opposing ends of the shading sheet 17 for tensioning the wires and the shading sheet 17 toward the vehicle width directions.

Using the wires 21 as holding members makes the shading sheet 17 vulnerable to slacking inwardly in the vehicle width direction, however, the slanted portions 13A generate tensional forces that bias the wires 21 and the shading sheet 17 outwardly in the vehicle width direction, thus, while reducing the thickness the holding members, slacking of the shading sheet 17 is controlled favorably.

According to further aspect of this disclosure, each of the guide rails 13 is curved in a manner that a middle portion 13h in the vehicle front and rear directions is projected in the vehicle upward direction 22a. Each of the slanted portion 13A is bent from an inner edge in the vehicle width directions of the corresponding guide rail 13 toward a different direction from the vehicle width directions. An overlap of the side edge portion 17c at opposing ends of the shading sheet 17 over the slanted portion of the corresponding guide rail 13 is defined to be larger at the middle portion 13h in the vehicle front and rear directions of the guide rail 13 compared to the overlap defined at the front end and rear end portions 13a, 13b in the vehicle front and rear directions of the guide rail 13.

More slacking of the shading sheet 17 may occur at the middle portion 13h in the vehicle front and rear directions, however, curving the guide rails 13 to project in the vehicle upward direction 22a provides a larger area of the side edge portion 17c of the shading sheet 17 that interacts with the corresponding slanted portions 13A relative to the area at the front end portion 13a and rear end portion 13b. With the aforementioned manner, a larger tensional force is generated at the middle portion 13h of the shading sheet, so that the slacking of the shading sheet 17 is controlled favorably at where more slacking may occur compared to at the front end and rear end portions 13a, 13b in the vehicle front and rear directions of the shading sheet 17 where slacking is less.

According to another aspect of this disclosure, the torsion spring 24 is contained within the retracting unit 18.

By integrating the torsion spring 24 within the retracting unit 18, a thickness of the retracting unit 18 is reduced.

According to further aspect of this disclosure, torsion springs 24 are used as the biasing members.

By using torsion springs 24, the biasing members may be contained within the retracting unit 18 so that the thickness of the retracting unit 18 is reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunshade apparatus for a vehicle, comprising:
a shading sheet opening and closing a light transmitting portion of a vehicle roof;
a pair of holding members retaining the shading sheet;
a winding member winding the shading sheet and the holding members; wherein
the holding members retain the shading sheet at a pair of edge portions of the shading sheet, the edge portions opposing each other and extending in shading sheet opening-closing directions;
the holding members are retained to the winding member in a manner so that for each of the holding members, winding in at one end causes winding out at an other end, and a direction of movement of each of the holding members is reversed at a direction change member positioned at a distance from the winding member in the shading sheet opening-closing directions;
the winding member includes a biasing member configured to impart balancing tensional forces acting on the holding members in the shading sheet opening-closing directions at one end and the other end of each of the holding members;
each holding member is a wire; and
the shading sheet is engaged to each wire by enfolding the wire by the corresponding edge portion of the shading sheet.

2. The sunshade apparatus for the vehicle according to claim 1, wherein
each wire includes an inner portion and an outer portion arranged side by side to one another with the wire being folded back at the direction change member,
the inner portion includes a holding portion, which engages the shading sheet.

3. The sunshade apparatus for the vehicle according to claim 1, wherein
the shading sheet includes a moving member at an end in the shading sheet opening-closing directions; and
apposing ends of the moving member are engaged with the wires to be biased by the wires toward the opposing directions.

4. The sunshade apparatus for a vehicle according to claim 3, further comprising:
   a guiding member guiding each of the wires toward a corresponding winding member portion,
   the guiding member biasing the wire toward opposing directions of the edge portions of the shading sheet for winding each of the wires to the corresponding winding member portion, wherein
   an end position of each of the wires at a corresponding winding member portion shifts in the opposing directions so that the diameter at one end where the wire is being wound out is kept equal with the diameter at the other end where the wire is being wound in.

5. The sunshade apparatus for the vehicle according to claim 3 further comprising:
   guide rails for guiding the moving member in the shading sheet opening-closing directions;
   each of the guide rails including a contact portion contacting and biasing the corresponding edge portion at the opposing ends of the shading sheet for tensioning the wires and the shading sheet toward the opposing directions.

6. The sunshade apparatus for the vehicle according to claim 5, wherein
   each of the guide rails is curved in a manner such that a middle portion of each of the guide rails in the shading sheet opening-closing directions is elevated in a vehicle upward direction;
   each of the contact portions is a slanted portion being bent from an inner edge in the opposing directions; and
   an overlap of the shading sheet over the slanted portion larger at the middle portion as compared to the overlap defined at end portions of the guide rail.

7. The sunshade apparatus for the vehicle according to claim 1, wherein the biasing member is contained within the winding member.

8. The sunshade apparatus for the vehicle according to claim 1, wherein the biasing member is a torsion spring.

* * * * *